United States Patent Office 2,958,492
Patented Nov. 1, 1960

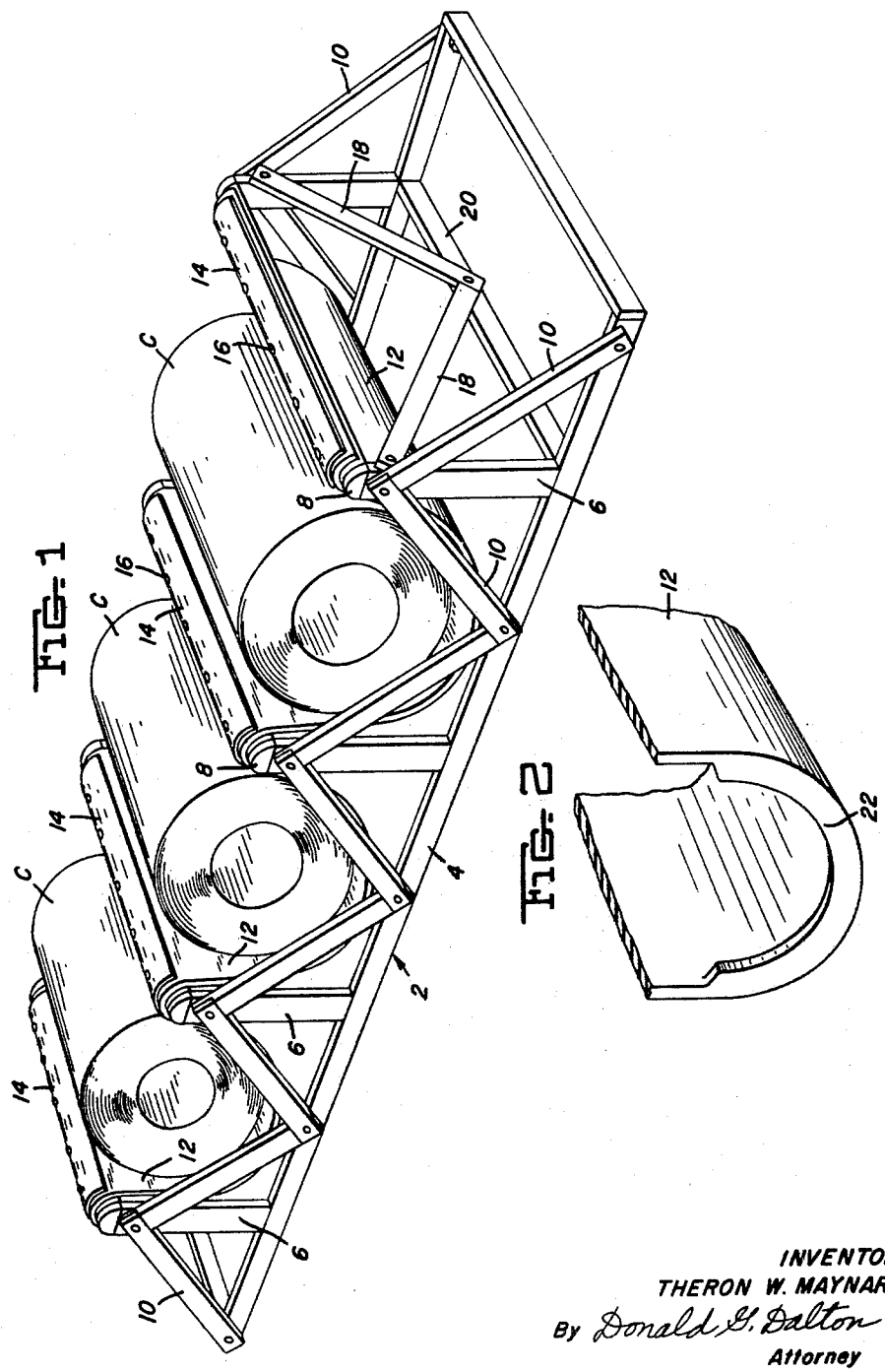

2,958,492

COIL CARRIER

Theron W. Maynard, Burlingame, Calif., assignor to United States Steel Corporation, a corporation of New Jersey Filed Jan. 22, 1959, Ser. No. 788,374

2 Claims. (Cl. 248—119)

The present invention relates generally to apparatus for handling articles for transit and more particularly has for its primary object the provision of a sling-type carrier for coiled material in transit.

These and other objects will become more apparent after referring to the following specification and attached drawings, in which:

Figure 1 is a perspective view of the carrier of the invention; and

Figure 2 is a partial perspective view of a modified form of sling element of the carrier of the invention.

Referring more particularly to the drawings reference numeral 2 designates generally the carrier frame of the invention which includes a base 4 and a plurality of pairs of spaced vertical upright supports 6 which project upwardly from the base 4. A beam 8 is connected with and extends between the upright supports in each pair transversely of the base 4. Braces 10 are connected with and extend angularly between the upper portion of each of the upright supports 6 and the base 4.

A sling 12 of pliable material such as rubber or the like is suspended between adjacent pairs of the upright supports. The ends of each sling are secured onto the adjoining beams 8 by means of a plate 14 and screws 16. Cross braces 18 may be provided connected with and extending between the upright supports 6 and cross beams 20 of the base 4.

In operation, the frame 2 is first anchored securely to the floor of a transport vehicle such as a gondola, highway truck or similar vehicle, the coils C are then loaded onto the slings 12 by means of an overhead crane, a fork-lift truck or other similar means. Upon arrival at destination, the coils are removed from the slings by an overhead crane, fork-lift truck or similar means whereupon the coil carrier of the invention may be returned to the shipper or it may be retained by the consignee and used as a storage unit for the coiled material. It will be noted that the coil carrier may consist of one or more slings as desired. Also, the coil carrier may be loaded with a coil or coils before being positioned in the transportation vehicle.

The coil carrier of the invention provides a means for transporting coiled material without damage in transit or during loading and unloading. By means of the coil carrier of the invention the coil being transported is provided with a floating support along its full width and one-half its circumference and at the same time is protected from contact damage caused by transportation movements. The carrier of the invention, in either single or multiple unit form, can be used with any type of transportation equipment and is inexpensive to manufacture.

The carrier frame 2 including its base and vertical upright supports may be made of hardwood or metal, as desired, and the slings can be formed from rubber covered conveyor belting.

It will be noted that the sling 12 is preferably of greater width than the coils which are to be handled and may, if necessary, be constructed with flanged edges 22, as shown in Figure 2, to provide protection for the edges of the coil should it move laterally in the sling.

While one embodiment of my invention has been shown and described, it will be apparent that other adaptations and modifications may be made without departing from the scope of the following claims.

I claim:

1. Apparatus for carrying a cylindrical article above the floor of a vehicle comprising a base, two spaced apart pairs of upright supports on said base, said pairs of upright supports being spaced apart longitudinally of said base, said base extending longitudinally beyond each of said pairs of upright supports, a beam extending transversely of and above said base between the upper portions of the upright supports in each pair, a sling of flexible material suspended between said pairs of upright supports for receiving said article, means securing the ends of said sling to said beams, a bracing member intermediate said pairs of upright supports attached to and extending angularly between each side of said base and the corresponding side of the upper portion of each upright support, each of said bracing members spanning a portion of a side of said sling to thereby limit sidewise movement of an article received on said sling, and a flange portion on each of the two opposed sides of said sling adjacent said bracing members.

2. Apparatus for carrying a cylindrical article as defined by claim 1 including a bracing member attached to and extending angularly between each side of said base at a point adjacent the end thereof and the corresponding side of the upper portion of each upright support.

References Cited in the file of this patent

UNITED STATES PATENTS

| | | |
|---|---|---|
| 1,131,477 | Crofoot | Mar. 9, 1915 |
| 2,483,582 | Hill | Oct. 4, 1949 |
| 2,632,567 | Richtmyer | Mar. 24, 1953 |